Oct. 5, 1971     C. E. BENTZ     3,610,044

PNEUMATIC TEMPERATURE SENSING DEVICE

Filed June 21, 1968     2 Sheets-Sheet 1

INVENTOR.
CHARLES E. BENTZ
BY Harry A. Herbert Jr.
ATTORNEY
Richard J. Killoren
AGENT Oct. 5, 1971   C. E. BENTZ   3,610,044
PNEUMATIC TEMPERATURE SENSING DEVICE
Filed June 21, 1968   2 Sheets-Sheet 2
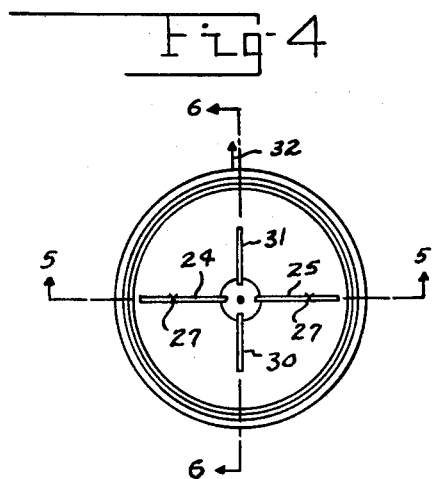
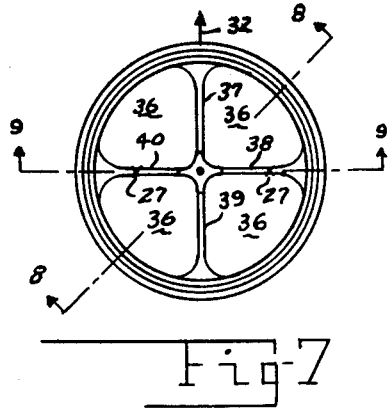
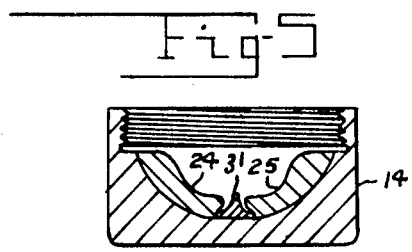
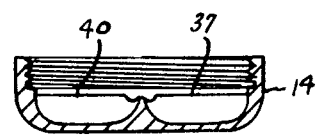
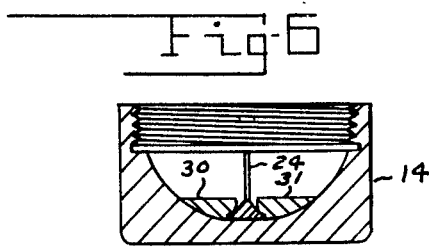
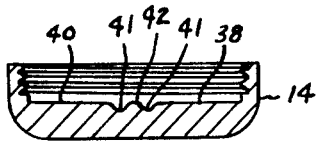
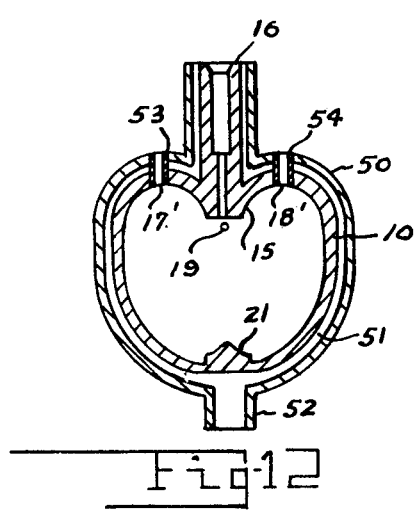
INVENTOR.
CHARLES E. BENTZ
BY Harry A. Herbert Jr.
ATTORNEY
Richard J. Killoer
AGENT

United States Patent Office 3,610,044
Patented Oct. 5, 1971

3,610,044
PNEUMATIC TEMPERATURE SENSING DEVICE
Charles E. Bentz, Dayton, Ohio, assignor to the United States of America as represented by the Secretary of the Air Force
Filed June 21, 1968, Ser. No. 740,827
Int. Cl. G01k 11/22
U.S. Cl. 73—339 A 8 Claims

ABSTRACT OF THE DISCLOSURE

A pneumatic temperature sensing oscillator has a gas, for which the temperature determination is desired, fed through a nozzle to impinge on a blunt beam splitter within a cavity. The reflection of acoustic signals off the blunt beam splitter and cavity walls results in the propagation of a predominant cavity frequency which varies sinusoidally with time that is a function of the square root of gas temperature within the cavity. Flow directing means are provided within the cavity.

BACKGROUND OF THE INVENTION

Various types of pneumatic temperature sensing oscillators are known in the art. These, however, have been essentially two-dimensional devices which are very sensitive to variations in the pressure of the gas supplied to the sensor especially at low pressures.

SUMMARY OF THE INVENTION

According to this invention, a pneumatic temperature sensing oscillator is provided that takes a gas whose temperature is to be measured and produces a signal indicative of the temperature of the gas. The gas is fed through a nozzle into a three-dimensional cavity of substantially circular cross section in a direction perpendicular to the gas flow from the nozzle. The gas is directed toward a blunt beam splitter within the cavity. The reflection of the signals off the cavity walls and the blunt beam splitter result in a predominant cavity frequency of large amplitude. Since the acoustic velocity of propagation is a function of the square root of temperature of the gas entering the device, the frequency of oscillation is also a function of temperature. At least one gas outlet is provided in the cavity wall adjacent the nozzle. The inlet nozzle, the blunt beam splitter and the gas outlet broadly determine a plane which is at right angle to the general plane of oscillation within the cavity. With the nozzle and beam splitter on the axis of the cavity, the angular position of the gas outlet can be said to broadly establish the plane of oscillation within the cavity. Additional gas outlets could be provided so long as they lie substantially in the same plane with the gas outlets being located in the nozzle assembly. For example, two or more outlets could be located close together on one side of the nozzle or outlets could be located on opposite sides of the inlet nozzle in substantially the same plane. A signal output tube is positioned in a side wall substantially 90° from the plane of the gas outlet. Two signal output tubes may be located 180° apart to provide a push-pull output signal if desired. The output signal may be supplied to a fluid frequency detector to provide a temperature indication or a control signal.

BRIEF DESCRIPTION OF THE DRAWING

FIG. 4 is a top plan view, reduced in size, of a modified target assembly for the oscillator of FIG. 1;
FIG. 5 is a sectional view of the device of FIG. 4 along the line 5—5;
FIG. 6 is a sectional view of the device of FIG. 4 along the line 6—6;
FIG. 7 is a top plan view, reduced in size, of a target assembly for the device of FIG. 1 according to another embodiment of the invention;
FIG. 8 is a sectional view of the device of FIG. 7 along the line 8—8;
FIG. 9 is a sectional view of the device of FIG. 7 along the line 9—9;
FIG. 12 shows a modified oscillator structure with a jacket to reduce the heat flux between the gas within the sensor and the sensor body.

DESCRIPTION OF THE PREFERRED EMBODIMENT

Figure 1:
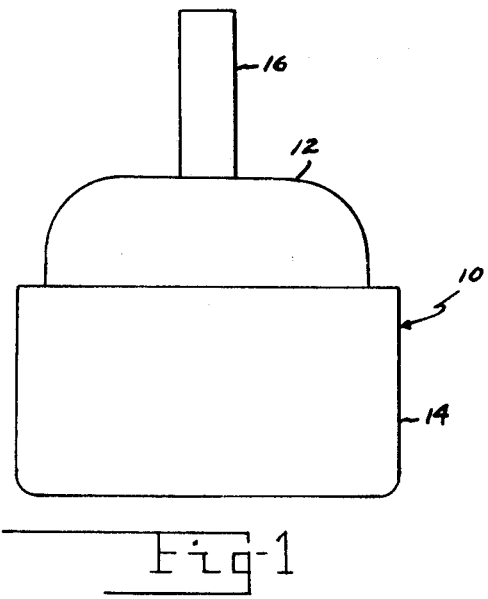
FIG. 1 is a front elevational view of a pneumatic temperature sensing oscillator according to the invention.
Figure 2:
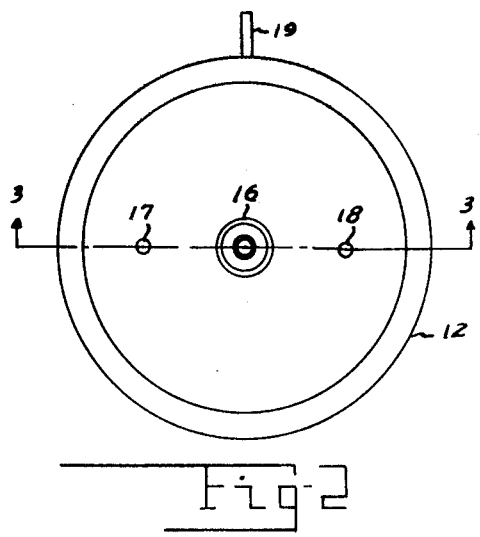
FIG. 2 is a top view of the device of FIG. 1.
Figure 3:
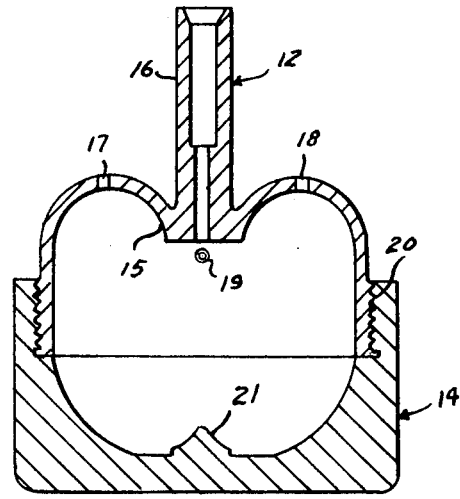
FIG. 3 is a sectional view of the device of FIG. 2 along the line 3—3.

Reference is now made to FIG. 1 of the drawing which shows a pneumatic oscillator 10 having a nozzle assembly 12 and a target assembly 14.
As shown more clearly in FIGS. 2 and 3, the nozzle assembly 12 has a gas input nozzle 15, to which gas is supplied from input tube 16, and a pair of gas output orifices 17 and 18. Though two gas output orifices are shown, a single orifice is sufficient for operation. A signal output tube 19 passes through the sidewall of the nozzle assembly 12. For maximum output signal the tube 19 should be located approximately 90° from gas outputs 17 and 18. However, for some applications, output signals may be obtained from gas outputs 17 and 18.
The target assembly is attached to the nozzle assembly by means of threads 20. A blunt beam splitter target 21 is positioned within the target assembly such that when the two parts are assembled the target 21 is directly opposite the input nozzle 15. The material used for the oscillator would be determined by the temperature requirements. For very low temperatures, brass or plastics may be used. For higher temperatures, stainless steel or other high temperature materials would be required. A replaceable insert, not shown, may be provided in the input tube 16 for adjusting the position of the nozzle with respect to the beam splitter if desired. The insert may be made of a heat insulating material to reduce heat flow to the tube wall.
In the operation of the device of the invention, a hot gas, for which the temperature determination is desired, is supplied to input tube 16 and nozzle 15 which directs the gas flow toward beam splitter 21. The reflection of acoustic signals off the cavity walls and the blunt beam splitter results in the propagation of a predominant cavity frequency of large amplitude with the frequency of the oscillations being determined by the oscillator configuration and temperature of the gas entering the device. The output signal at 19 may be used to provide a temperature indication or may be used to operate control equipment. Though one output is shown, two outputs 180° apart may be provided for push-pull operation. The devices built have been found to be relatively insensitive to large changes in the pressure of the supply gas.
A target assembly device with higher signal-to-noise ratio and which will operate at lower pressures than the device just described is shown in FIG. 4 through 6. With plate members 24 and 25 positioned with respect to discharge apertures 17 and 18, as indicated by the X marks 27, the device was found to operate at much lower pressures than the device of FIGS. 1 through 3. With plates 30 and 31 added, considerable improvement in the signal-to-noise ratio was acquired. The relative position of the signal output tube in member 12 is indicated by arrow 32. The plates 24, 25, 30 and 31 may be secured in any manner known in the art; for example, the plates may be inserted in slots provided in member 14.

Other structures providing improved results are shown in FIGS. 7 through 11. In the device of FIGS. 7 through 9, four depressions 36 are machined into the target assembly member to leave partitions 37, 38, 39 and 40. The partitions are machined at 41 to provide a beam splitter target 42. The relative position of gas outputs 17 and 18 are again shown by the X marks 27, with the position of the signal output being indicated by arrow 32.

Figure 10:
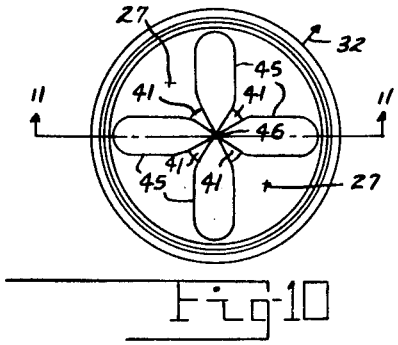
FIG. 10 shows a top plan view, reduced in size, of another embodiment for the target assembly of FIG. 1.
Figure 11:
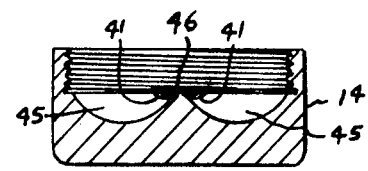
FIG. 11 is a sectional view of the device of FIG. 10 along the line 11—11.

In the device of FIGS. 10 and 11, four elongated grooves 45 are machined in the target assembly 14. This device also has machined portions 41 to provide a beam splitter target 46. The position of gas outputs 17 and 18 are again indicated by X marks 27, with the signal output being indicated by arrow 32.

So that temperature loss to the walls of the pneumatic oscillator of the invention will not cause errors in temperature indication during steady-state and transient operation, the device should be located as close to the test gas supply as possible. When it is not possible to locate the oscillator close to the gas supply, a jacket 50 may be provided around the oscillator as shown in FIG. 12. In this case, some of the gas for which a temperature signal is desired is passed through the space 51 between the oscillator 10 and the jacket 50 to output 52. The tubes 53 and 54 provide gas outputs 17' and 18'. In addition to the support provided by tubes 53 and 54, additional supports between oscillator 10 and jacket 50 may be provided where needed.

While the member 12 is shown as threaded to member 14, the members may be connected in other ways such as by welding or by means of clamps.

There is thus provided a device for sensing the temperature of a gas.

While a certain specific embodiment has been described, it is obvious that numerous changes may be made without departing from the general principles and scope of the invention.

I claim:
1. A pneumatic temperature sensing oscillator comprising means for providing a resonant chamber having a circular cross section; means for admitting a hot gas to said chamber, along the axis of the circular section; a blunt projection within said chamber directly opposite said gas admitting means; gas outlet means, in said chamber, for establishing the plane of oscillation within the chamber; and means for obtaining an output signal from said chamber.

2. The device as recited in claim 1 wherein the gas outlet means is a pair of gas outlet orifices positioned on opposite sides of said gas admitting means.

3. The device as recited in claim 2 wherein gas flow directing means are positioned adjacent said blunt projection within said chamber.

4. The device as recited in claim 3 wherein said gas flow directing means are a first pair of opposed plate members angularly positioned in substantially the same plane with the gas outlet orifices; and a second pair of opposed plate members angularly positioned 90° with respect to said first plate members.

5. The device as recited in claim 3 wherein said gas flow directing means are four wide grooves separated by narrow wall members spaced 90° apart around the blunt projection, with two of said wall members being angularly positioned in substantially the same plane as the gas outlets.

6. The device as recited in claim 3 wherein said gas flow directing means are four radial grooves spaced 90° apart around the blunt projection, with said grooves being angularly positioned 45° with respect to the plane of the gas outlets.

7. The device as recited in claim 1 including a jacket member spaced from said resonant chamber, means for passing a portion of said hot gas to the space between the resonant chamber and said jacket member.

8. The device as recited in claim 3 including a jacket member spaced from said resonant chamber, means for passing a portion of said hot gas to the space between the resonant chamber and said jacket member.

References Cited
UNITED STATES PATENTS

| | | | |
|---|---|---|---|
| 3,158,166 | 11/1964 | Warren | 137—81.5 |
| 3,185,166 | 5/1965 | Horton et al. | 137—81.5 |

VERLIN R. PENDEGRASS, Primary Examiner

U.S. Cl. X.R.

73—357